United States Patent
Kondameedi et al.

(10) Patent No.: US 9,895,755 B2
(45) Date of Patent: Feb. 20, 2018

(54) CUTTING INSERT WITH INTERNAL COOLANT PASSAGES AND METHOD OF MAKING SAME

(71) Applicant: Kennametal Inc., Latrobe, PA (US)

(72) Inventors: Naveen Kondameedi, Sylvania, OH (US); Raouf Ben Amor, Fuerth (DE); Jyothi Komatiereddy, Bangalore (IN)

(73) Assignee: KENNAMETAL INC., Latrobe, PA (US)

(*) Notice: Subject to any disclaimer, the term of this patent is extended or adjusted under 35 U.S.C. 154(b) by 308 days.

(21) Appl. No.: 14/564,452

(22) Filed: Dec. 9, 2014

(65) Prior Publication Data

US 2016/0158855 A1    Jun. 9, 2016

(51) Int. Cl.
| | |
|---|---|
| *B23B 27/10* | (2006.01) |
| *B23C 5/28* | (2006.01) |
| *B23C 5/20* | (2006.01) |
| *B23B 27/16* | (2006.01) |
| *B23B 51/06* | (2006.01) |
| *B23B 27/14* | (2006.01) |
| *B23D 77/00* | (2006.01) |
| *B23P 15/30* | (2006.01) |
| *B23P 15/34* | (2006.01) |

(Continued)

(52) U.S. Cl.
CPC .............. *B23C 5/28* (2013.01); *B23B 27/10* (2013.01); *B23B 27/145* (2013.01); *B23B 27/1611* (2013.01); *B23B 51/06* (2013.01); *B23C 5/207* (2013.01); *B23D 77/006* (2013.01); *B23K 26/146* (2015.10); *B23K 26/384* (2015.10); *B23K 26/389* (2015.10); *B23P 15/30* (2013.01); *B23P 15/34* (2013.01); *B23B 2205/12* (2013.01); *B23B 2250/12* (2013.01); *B23C 2250/12* (2013.01)

(58) Field of Classification Search
CPC ....... B23C 5/28; B23C 2200/36; B23B 27/10; B23B 2200/36; B23B 2250/12
See application file for complete search history.

(56) References Cited

U.S. PATENT DOCUMENTS

| | | |
|---|---|---|
| 3,096,668 A | 7/1963 | Maynard |
| 4,535,216 A | 8/1985 | Cassidenti et al. |

(Continued)

FOREIGN PATENT DOCUMENTS

| | | | | |
|---|---|---|---|---|
| DE | 10-2009040577 | * | 9/2009 | ............. B23B 27/10 |
| DE | 10 2009 040 577 A1 | | 4/2011 | |

(Continued)

*Primary Examiner* — Will Fridie, Jr.
(74) *Attorney, Agent, or Firm* — Matthew S. Bedsole (57) ABSTRACT

A cutting insert (100, 100') includes a body (102) having a top face (104), a bottom face (106) opposite the top face (104), and at least one flank face (108, 110, 112, 114). A coolant inlet aperture (126), a coolant outlet aperture (132, 134), and an internal coolant passage (128, 130) in fluid communication with the coolant inlet aperture (126) and the coolant outlet aperture (132, 134) are formed using electromagnetic radiation. The coolant inlet aperture (126) can be formed in the top face (104), the bottom face (106) and/or the flank face (108, 110, 112, 114), and the coolant outlet aperture (132, 134) can be formed in any different face (104, 106, 108, 110, 112, 114). A method of forming the internal coolant passages (128, 130) is described.

14 Claims, 8 Drawing Sheets

(51) Int. Cl.
*B23K 26/382* (2014.01)
*B23K 26/384* (2014.01)
*B23K 26/146* (2014.01)

(56) References Cited

U.S. PATENT DOCUMENTS

| | | | | |
|---|---|---|---|---|
| 4,621,547 | A * | 11/1986 | Yankoff | B23B 27/167 407/11 |
| 5,346,335 | A | 9/1994 | Benjamin et al. | |
| 5,624,030 | A * | 4/1997 | Rademacher | B65D 19/38 206/386 |
| 5,901,623 | A * | 5/1999 | Hong | B23B 27/10 407/100 |
| 5,902,499 | A | 5/1999 | Richerzhagen | |
| 6,045,301 | A | 4/2000 | Boreschert et al. | |
| 6,307,175 | B1 | 10/2001 | Bletheling et al. | |
| 6,637,984 | B2 * | 10/2003 | Murakawa | B23B 27/10 407/11 |
| 7,625,157 | B2 | 12/2009 | Prichard et al. | |
| 7,802,947 | B2 * | 9/2010 | Endres | B23B 27/10 407/113 |
| 7,955,032 | B2 | 6/2011 | Nelson | |
| 8,215,878 | B2 * | 7/2012 | Rozzi | B23C 5/207 407/11 |
| 8,701,529 | B2 * | 4/2014 | Deschenaux | B23B 27/045 407/11 |
| 8,801,345 | B2 * | 8/2014 | Yoshino | B23B 1/00 29/27 R |
| 2003/0215295 | A1 | 11/2003 | Gaiser et al. | |
| 2005/0019116 | A1 * | 1/2005 | Vanberg | B23B 27/143 408/113 |
| 2010/0172704 | A1 * | 7/2010 | Nelson | B23B 27/10 407/114 |
| 2010/0175519 | A1 | 7/2010 | Brenner et al. | |
| 2010/0272529 | A1 | 10/2010 | Archibald et al. | |
| 2011/0097162 | A1 | 4/2011 | Gey et al. | |
| 2011/0214552 | A1 * | 9/2011 | Abe | B23B 27/1614 83/663 |
| 2011/0229277 | A1 * | 9/2011 | Hoffer | B23B 27/10 407/11 |
| 2012/0230781 | A1 * | 9/2012 | Hoffer | B23C 5/28 407/11 |
| 2013/0251463 | A1 | 9/2013 | Gershon et al. | |
| 2014/0255116 | A1 * | 9/2014 | Myers | B23B 51/06 408/59 |
| 2014/0334887 | A1 * | 11/2014 | Flolo | B23B 27/10 407/11 |
| 2015/0063926 | A1 * | 3/2015 | Wu | B23B 27/10 407/11 |
| 2016/0067786 | A1 * | 3/2016 | Thelin | B23B 27/007 407/11 |

FOREIGN PATENT DOCUMENTS

| | | |
|---|---|---|
| EP | 0 100 376 A2 | 2/1984 |
| GB | 795729 A | 5/1958 |
| JP | 60-9606 A | 1/1985 |
| JP | 04-183503 A | 6/1992 |
| WO | 99/56907 A1 | 4/1999 |
| WO | 2006/122441 A1 | 5/2006 |

* cited by examiner

CUTTING INSERT WITH INTERNAL COOLANT PASSAGES AND METHOD OF MAKING SAME

BACKGROUND OF THE INVENTION

Field of the Invention

The invention relates to a cutting insert used for chipforming and material removal operations, as well as a method for making the cutting insert. More specifically, the invention pertains to a cutting insert used for chipforming and material removal operations, as well as a method for making the cutting insert, wherein there is enhanced delivery of coolant adjacent the interface between the cutting edge of the cutting insert and the workpiece (i.e., the cutting edge-chip interface) to diminish excessive heat at the cutting edge-chip interface.

Description of Related Art

In a chipforming and material removal operation (e.g., a milling operation), heat is generated at the cutting edge-chip interface. It is well-known that excessive heat at the cutting edge-chip interface can negatively impact upon (i.e., reduce or shorten) the useful tool life of the cutting insert. As can be appreciated, a shorter useful tool life increases overall operating costs and decreases overall production efficiency. Hence, there are readily apparent advantages connected with providing a cutting insert that facilitates a decrease of the heat at the cutting edge-chip interface.

It is readily apparent that in a chipforming and material removal operation, higher operating temperatures at the cutting edge-chip interface can have a detrimental impact on the useful tool life. These higher temperatures can cause premature breakage and/or excessive wear, which results in reduction or shortening of the useful tool life. It therefore would be highly desirable to provide a cutting insert used for chipforming and material removal operations wherein there is an improved delivery of coolant to the cutting edge-chip interface.

In a cutting operation (e.g., turning operation or milling operation), the chip generated from the workpiece can sometimes stick (e.g., through welding) to the surface of the cutting insert (e.g., a turning insert or a milling insert). The build up of chip material on the cutting insert in this fashion is an undesirable occurrence that can negatively impact upon the performance of the cutting insert, and hence, the overall material removal operation. Thus, it would be highly desirable to provide a cutting inert (e.g., a turning insert or a milling insert), used for chipforming and material removal operations wherein there is enhanced delivery of coolant to the cutting edge-chip interface so as to result in enhanced lubrication at the cutting edge-chip interface. The consequence of enhanced lubrication at the cutting edge-chip interface is a decrease in the tendency of the chip to stick to the cutting insert.

In a cutting operation such as, for example, a milling operation, there can occur instances in which the chips do not exit the region of the cutting edge-chip interface when the chip sticks to the cutting insert. When a chip does not exit the region of the cutting edge-chip interface, there is the potential that a chip can be re-cut. It is undesirable for the cutting insert to re-cut a chip already removed from the workpiece. A flow of coolant to the cutting edge-chip interface will facilitate the evacuation of chips from the cutting edge-chip interface thereby minimizing the potential that a chip will be re-cut. Hence, it would be highly desirable to provide a cutting inert (e.g., a turning insert or a milling insert), used for chipforming and material removal operations wherein there is enhanced delivery of coolant to the cutting edge-chip interface so as to reduce the potential that a chip will be re-cut. The consequence of enhanced flow of coolant to the cutting edge-chip interface is better evacuation of chips from the vicinity of the interface with a consequent reduction in the potential to re-cut a chip.

Powder metallurgical techniques typically can be useful to make a cutting insert used for chipforming and material removal operations. In this regard, a powder mixture is pressed into a partially dense green compact. Then, the green compact is subjected to a consolidation treatment (e.g., vacuum sintering, pressure sintering, HIPing and the like) to consolidate the green compact into a fully dense body. While these powder metallurgical techniques are satisfactory, the use thereof to make cutting tools of a more complex geometry may raise a manufacturing challenge. It would thus be highly desirable to provide a cutting insert (e.g., a turning insert or milling insert) used for chipforming and material removal operations wherein there is enhanced delivery of coolant to the cutting edge-chip interface wherein the cutting insert is of a design, even though complex, that could be made via methods such as, for example, injection molding.

SUMMARY OF THE INVENTION

The problem of delivering high-pressure coolant flow to the cutting edge-chip interface is solved by providing one or more coolant holes that are formed by a laser beam so that coolant can be delivered directly to the cutting edge-chip interface.

The key feature of this invention is to be able to create coolant holes in cutting tips directly offering design freedom and application flexibility to deliver coolant directly at the cutting edge of the tool. Currently, coolant delivery is limited to carbide or steel shank from which point we rely on pressure and/or flow rate to flood the cutting volume with coolant. This can be overcome by creating these coolant channels in tips that transport the coolant directly to cutting area and in turn improving the mechanics of thermal equilibrium during metal cutting. The most important benefit of this invention is to assist with MQL (minimum quantity lubrication), ensure keeping pressure at an appropriate level and manipulate chip deformation, flow and evacuation. This concept will support the guidance of the required quantity of lubricant most effective to the desired area of the tool or work piece. It also eliminates the need to flood the cutting volume with coolant and in-turn deliver desired/required amount of coolant to cutting area directly. Benefits are two-fold: 1. Savings through minimizing coolant use and 2. Environmental impact.

In addition to the design aspect of the patent, focus also needs to be directed at manufacturability of such a design and a cutting tool as a whole. Electro-magnetic radiation is used in various form by manipulating the beam, and/or encasing the beam in a water-jet to make the cutting tool as depicted in the drawings. The cutting tool of the invention can be made by other means, such as a pressurized jet of a fluid having abrasive embedded therein, ultrasonic waves, mechanical vibrations, and the like. As used herein, electro-magnetic radiation is defined as radiation consisting of electromagnetic waves, including radio waves, infrared, visible light, ultraviolet, x-rays and gamma rays. The electro-magnetic radiation can be trepanned using galvanometers and/or passing them through rotating mirrors and/or using it in conjunction with a water-jet either encompassed through a water jet or used in addition to a water-jet to make the desired holes in cutting tips. The hole sizes could vary from 50 microns to 5 mm in width depth 5 microns to 50 mm in depth.

The intent of the patent disclosure is to connect such a hole drilled using the above technique to an existing coolant delivery channel that is already pressed, formed or sintered into the shank of a round tool or holder of an insert.

The selected manufacturing process allows to micro drill the nozzle and adjust its orientation angle and shape as required by a specific metal cutting operation. The localized volume removal ensures that cutting edge is preserved even when the coolant channel is machined in close proximity to the edge. Flexibility is built into the process as this can be applied to tipped inserts, inserts, round tools, tipped round tools, or any other cutting tool in various formats.

In one aspect of the invention, a method of manufacturing a cutting insert comprises:

forming a coolant inlet aperture in one of the top face, the bottom face and the at least one flank face, at least one internal coolant passage in fluid communication with the coolant inlet aperture, and a coolant outlet aperture in fluid communication with the at least one internal coolant passage, wherein the coolant inlet aperture, the at least one internal coolant passage and the coolant outlet aperture are formed by using electro-magnetic radiation.

In another aspect of the invention, a cutting insert is manufactured using the method described above.

In yet another aspect of the invention, a toolholder assembly comprises a body portion and a cutting end portion extending from the body portion. The cutting end portion includes a pocket having a bottom support surface and at least one side support surface. A cutting insert is mounted in the pocket. The cutting insert has a top face, a bottom face opposite the top face, at least one flank face, a coolant inlet aperture formed in one of the top face, the bottom face, and the at least one flank face, a coolant outlet aperture formed in a different one of the top face, the bottom face and the at least one of the flank face, and an internal coolant passage in fluid communication with the coolant inlet aperture and the coolant outlet aperture, wherein the coolant inlet aperture, the at least one internal coolant passage and the coolant outlet aperture are formed by using electro-magnetic radiation.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

DETAILED DESCRIPTION OF THE INVENTION

In the present description of non-limiting embodiments and in the claims, other than in the operating examples or where otherwise indicated, all numbers expressing quantities or characteristics of ingredients and products, processing conditions, and the like are to be understood as being modified in all instances by the term "about". Accordingly, unless indicated to the contrary, any numerical parameters set forth in the following description and the attached claims are approximations that may vary depending upon the desired properties one seeks to obtain in the apparatus and methods according to the present disclosure. At the very least, and not as an attempt to limit the application of the doctrine of equivalents to the scope of the claims, each numerical parameter should at least be construed in light of the number of reported significant digits and by applying ordinary rounding techniques.

Referring to the drawings, there should be an appreciation that the cutting insert of the invention, as well as the cutting assembly of the invention, can operate in a number of different applications. The cutting insert, which has internal coolant delivery, is for use in the chipforming removal of material from a workpiece. In this respect, the cutting insert is for use in a chipforming material removal operation wherein there is enhanced delivery of coolant adjacent the interface between the cutting insert and the workpiece (i.e., the cutting edge-chip interface) to diminish excessive heat at the cutting edge-chip interface. The coolant channels can be drilled and applied to tipped round tools, where such a tip could be made of Superhard material, such as Cubic Boron Nitride (CBN), Polycrystalline Cubic Boron Nitride (PCBN), Polycrystalline Diamonds (PCD), tungsten carbide (WC), cermet, ceramic, and the like.

The enhanced delivery of coolant to the cutting edge-chip interface leads to certain advantages. For example, enhanced delivery of coolant to the cutting edge-chip interface results in enhanced lubrication at the cutting edge-chip interface which decreases the tendency of the chip to stick to the cutting insert. Further, enhanced flow of coolant to the cutting edge-chip interface leads to better evacuation of chips from the vicinity of the interface with a consequent reduction in the potential to re-cut a chip.

As will be made apparent from the description hereinafter, the nature of the coolant dispersion or spray is such that it is continuous between the adjacent so-called activated interior coolant passages. The coolant actually exits the activated coolant passages in the form of a continuous cone of coolant, By providing such a coolant dispersion, the cutting insert achieves enhanced delivery of coolant to the cutting edge-chip interface.

There should also be an appreciation that the interior coolant passage discharge has an orientation whereby the coolant impinges beneath the chip surface. Such an orientation of the coolant enhances the cooling properties, which enhances the overall performance of the cutting insert.

The description herein of specific applications should not be a limitation on the scope and extent of the use of the cutting insert.

In the chipforming material removal operation, a cutting insert 100 engages a workpiece to remove material from a workpiece typically in the form of chips. A material removal operation that removes material from the workpiece in the form of chips typically is known by those skilled in the art as a chipforming material removal operation. The book *Machine Shop Practice* [Industrial Press Inc., New York, N.Y. (1981)] by Moltrecht presents at pages 199-204 a description, inter alia, of chip formation, as well as different kinds of chips (i.e., continuous chip, discontinuous chip, segmental chip). Moltrecht reads [in part] at pages 199-200, "When the cutting tool first makes contact with the metal, it compresses the metal ahead of the cutting edge. As the tool advances, the metal ahead of the cutting edge is stressed to the point where it will shear internally, causing the grains of the metal to deform and to flow plastically along a plane called the shear plane . . . . When the type of metal being cut is ductile, such as steel, the chip will come off in a continuous ribbon . . . ". Moltrecht goes on to describe formation of a discontinuous chip and a segmented chip.

As another example, the text found at pages 302-315 of the *ASTE Tool Engineers Handbook*, McGraw Hill Book Co., New York, N.Y. (1949) provides a lengthy description of chip formation in the metal cutting process. At page 303, the ASTE Handbook makes the clear connection between chip formation and machining operations such as turning, milling and drilling. The following patent documents discuss the formation of chips in a material removal operation: U.S. Pat. No. 5,709,907 to Battaglia et al. (assigned to Kennametal Inc.), U.S. Pat. No. 5,722,803 to Battaglia et al. (assigned to Kennametal Inc.), and U.S. Pat. No. 6,161,990 to Oles et al. (assigned to Kennametal Inc.).

Figure 1:
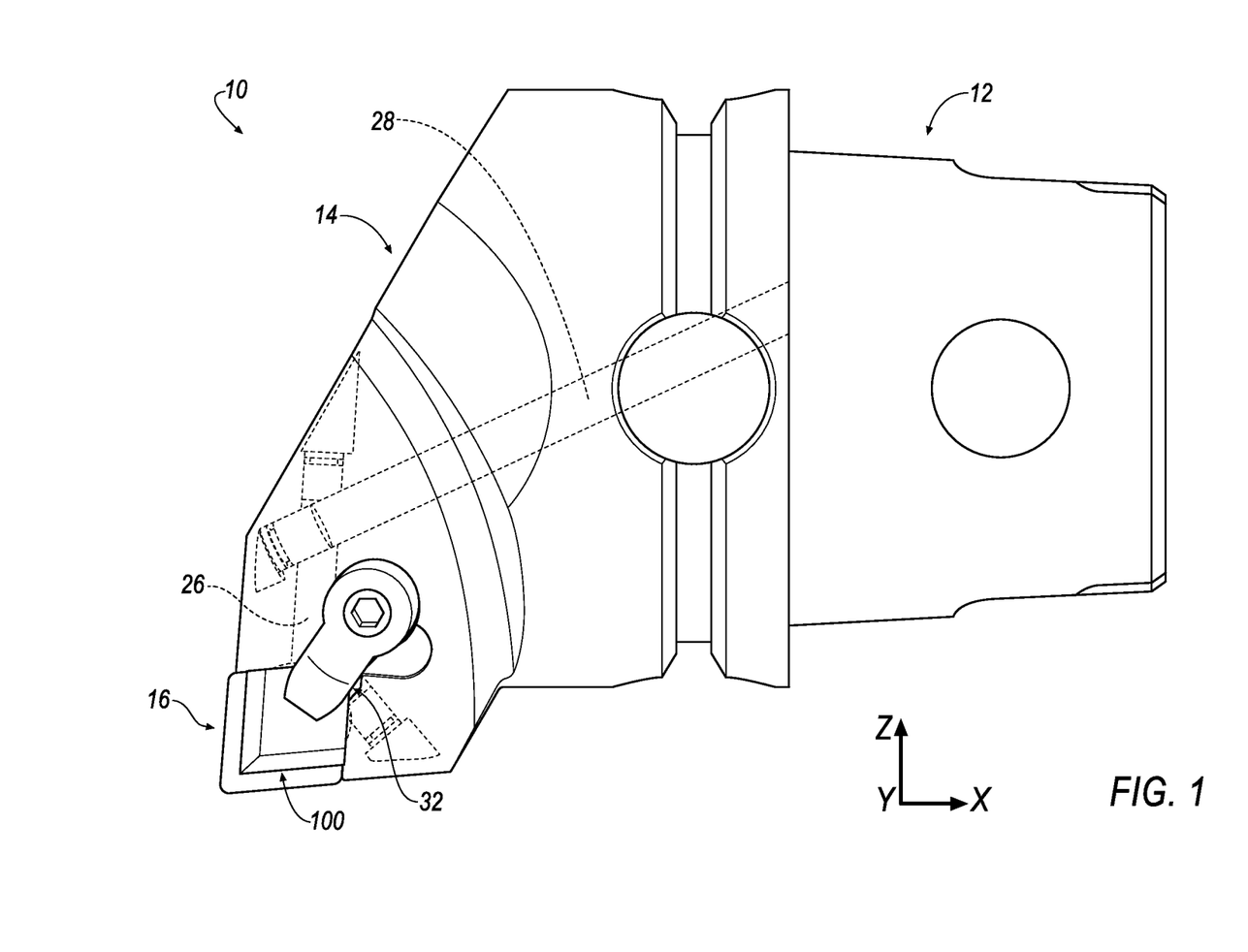
FIG. 1 is a top view of one specific embodiment of a toolholder assembly with coolant openings in a bottom support surface of the pocket and a cutting insert with an internal coolant passage according to the invention mounted in the pocket of the toolholder assembly.
Figure 2:
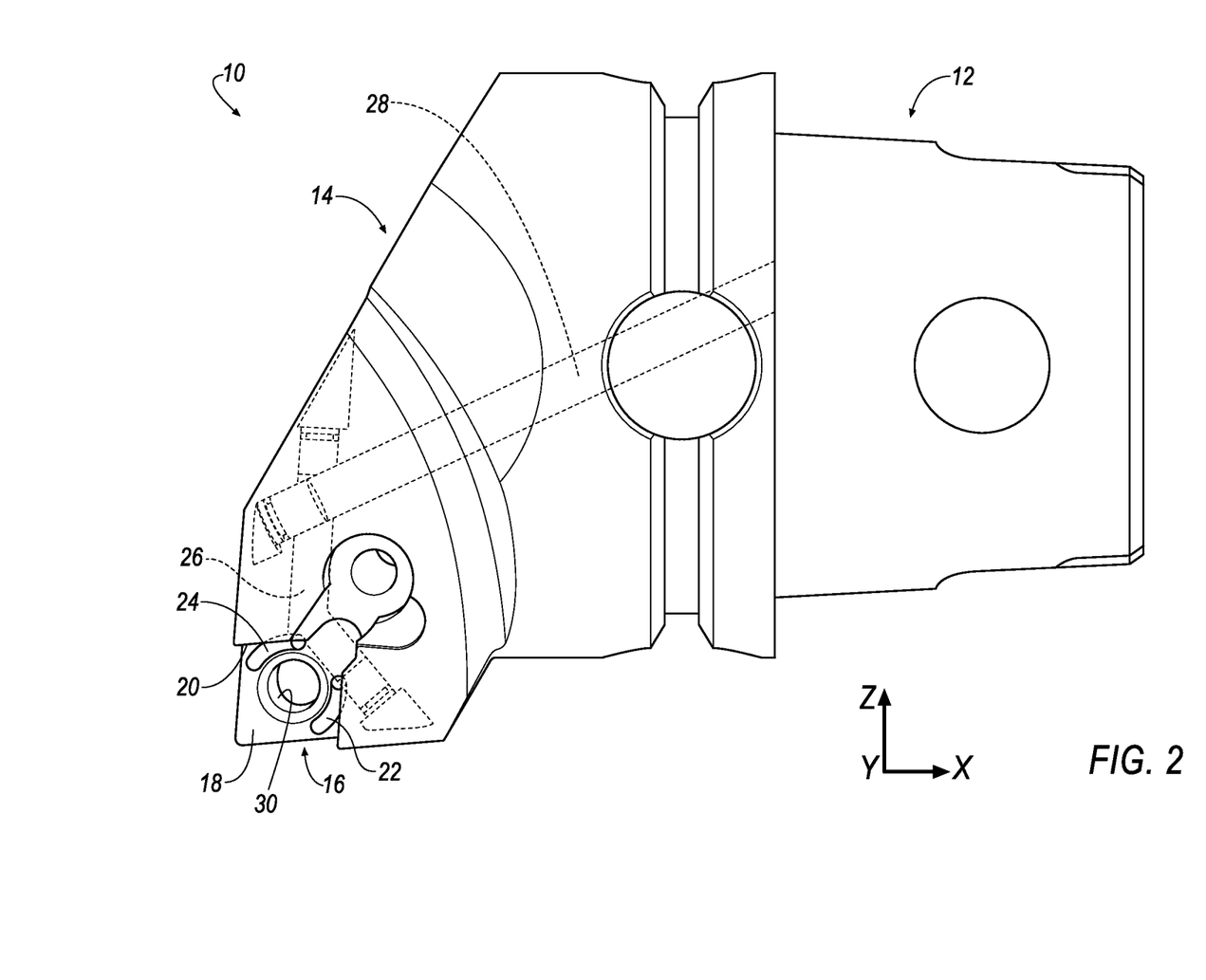
FIG. 2 is a top view of the toolholder assembly of FIG. 1 with a cutting insert of the invention removed not mounted in the pocket of the toolholder assembly to more clearly show the arcuate coolant opening in the bottom support surface of the pocket.
Figure 3:
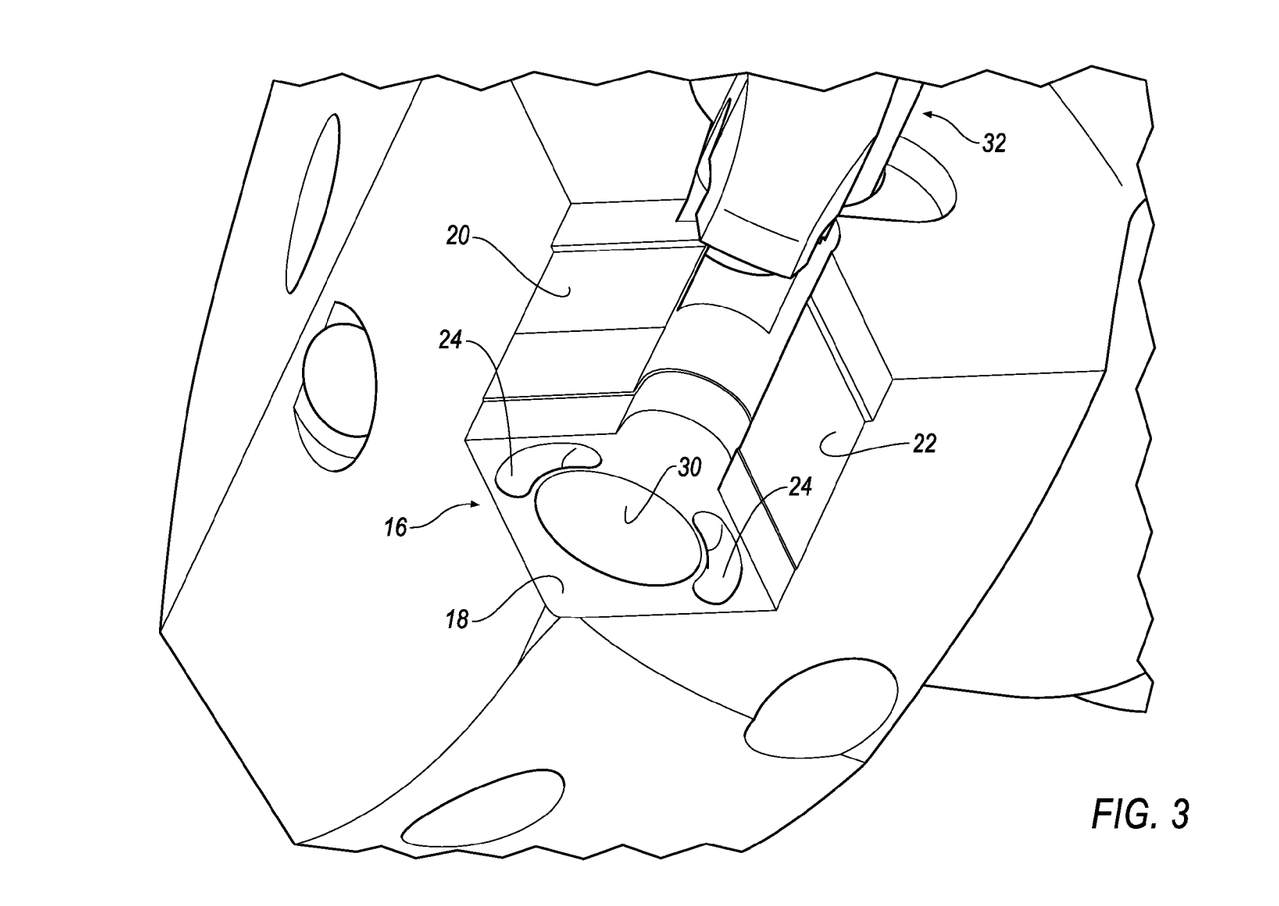
FIG. 3 is an enlarged view of the pocket of the toolholder assembly of FIG. 1 showing the arcuate coolant opening for supplying coolant to the cutting insert of the invention.

Referring to the drawings, FIGS. 1-3 show a toolholder assembly generally designated as 10 according to an embodiment of the invention. The toolholder assembly 10 has a body portion 12 and a cutting end portion 14 extends in a radial outward fashion from the body portion 12. The cutting end portion 14 contains a pocket, shown generally at 16. The pocket 16 includes a substantially planar bottom support surface 18 and a pair of side support surfaces 20, 22, as shown in FIG. 2. The bottom support surface 18 and the side support surfaces 20, 22 generally conform to the shape of a cutting insert 100 to be mounted thereon.

The bottom support surface 18 contains at least one arcuate coolant opening 24 in fluid communication with a coolant passage 26. Coolant from a coolant source 28 enters the coolant passage 26 and travels so to exit at the arcuate coolant opening 24. Coolant exiting from the arcuate coolant opening 24 then passes into the cutting insert 100, as will be set forth in more detail hereinafter. In the illustrated embodiment, the bottom support surface 18 contains two arcuate coolant openings 24 located on opposite sides of a threaded bore 30. However, it will be appreciated that the invention is not limited by the number of coolant openings 24, and that the invention can be practiced with any desirable number of coolant openings 24 for providing a sufficient coolant flow rate to a cutting insert 100.

In addition, there should be an appreciation that any one of a number of different kinds of fluid or coolant are suitable for use in the toolholder assembly 10 and the cutting insert 100. Broadly speaking, there are two basic categories of fluids or coolants; namely, oil-based fluids which include straight oils and soluble oils, and chemical fluids which include synthetic and semisynthetic coolants. Straight oils are composed of a base mineral or petroleum oil and often contain polar lubricants such as fats, vegetable oils, and esters, as well as extreme pressure additives of chlorine, sulfur and phosphorus. Soluble oils (also called emulsion fluid) are composed of a base of petroleum or mineral oil combined with emulsifiers and blending agents Petroleum or mineral oil combined with emulsifiers and blending agents are basic components of soluble oils (also called emulsifiable oils). The concentration of listed components in their water mixture is usually between 30-85%. Usually the soaps, wetting agents, and couplers are used as emulsifiers, and their basic role is to reduce the surface tension. As a result, they can cause a fluid tendency to foam. In addition, soluble oils can contain oiliness agents such as ester, extreme pressure additives, alkanolamines to provide reserve alkalinity, a biocide such as triazine or oxazolidene, a defoamer, such as a long chain organic fatty alcohol or salt, corrosion inhibitors, antioxidants, etc. Synthetic fluids (chemical fluids) can be further categorized into two subgroups: true solutions and surface active fluids. True solution fluids are composed essentially of alkaline inorganic and organic compounds and are formulated to impart corrosion protection to water. Chemical surface-active fluids are composed of alkaline inorganic and organic corrosion inhibitors combined with anionic non-ionic wetting agents to provide lubrication and improve wetting ability. Extreme-pressure lubricants based on chlorine, sulfur, and phosphorus, as well as some of the more recently developed polymer physical extreme-pressure agents can be additionally incorporated in this fluids. Semisynthetics fluids (also called semi-chemical) contains a lower amount of refined base oil (5-30%) in the concentrate. They are additionally mixed with emulsifiers, as well as 30-50% of water. Since they include both constituents of synthetic and soluble oils, characteristics properties common to both synthetics and water soluble oils are presented.

Figure 4:
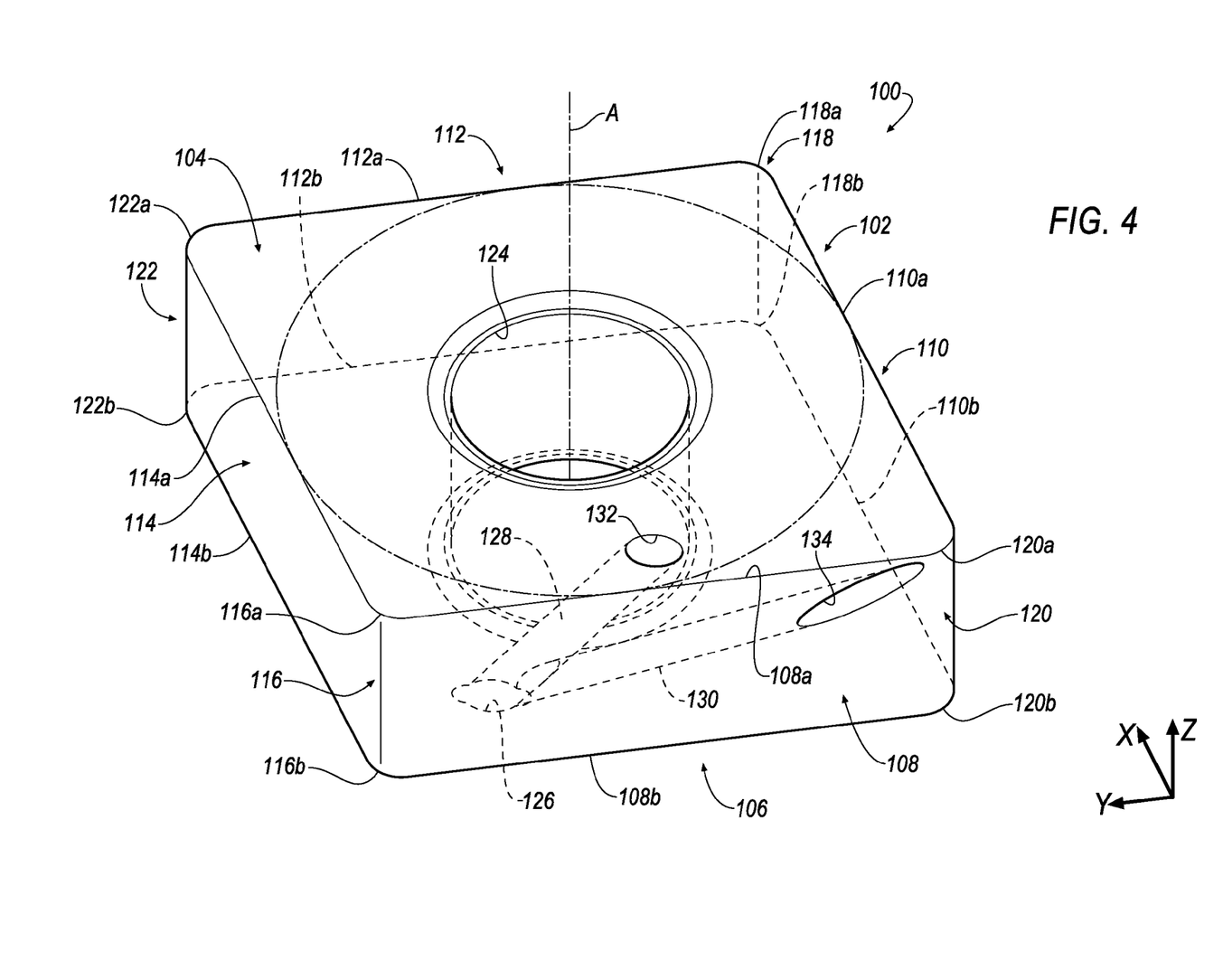
FIG. 4 is an isometric top view of the cutting insert manufactured using the method of the invention.
Figure 5:
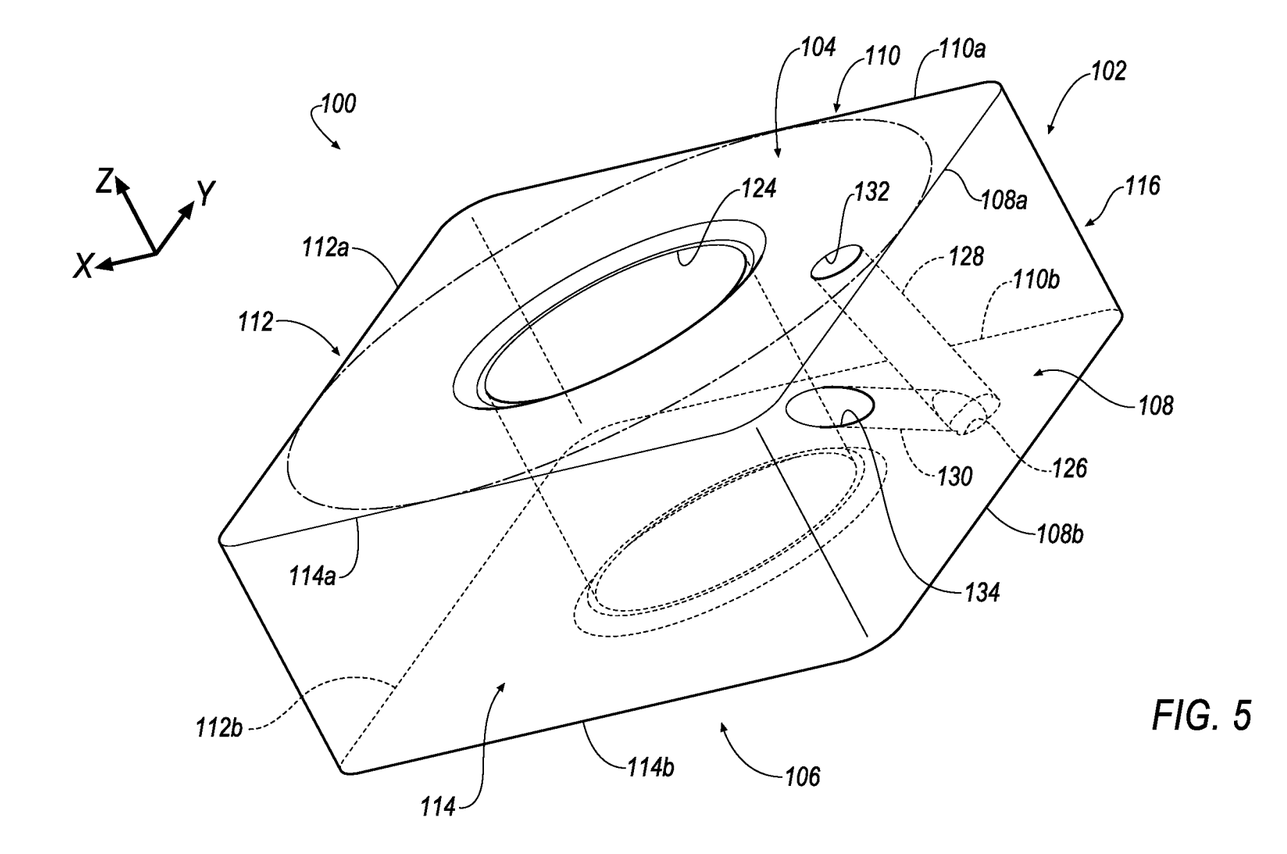
FIG. 5 is another isometric top view of the cutting insert manufactured using the method of the invention.

Referring now to FIGS. 4 and 5, the cutting insert 100 that is suitable for use with the toolholder assembly 10 is shown according to an embodiment of the invention. It is typical that the cutting insert 100 is made by a powder metallurgical technique. In this regard, the starting powder components for the milling insert are first blended or milled into a starting powder mixture. A lubricant or fugitive binder is typically included as a starting component. The starting powder mixture is then pressed into the shape of a milling insert (i.e., a green compact) that has partial density. The green compact is then subjected to a consolidation treatment, typically at an elevated temperature and optionally under pressure. The consolidation treatment can include pressure sintering, vacuum sintering, hot isostatic pressing and other known consolidation processes. The resultant article is an essentially fully dense post-consolidation milling insert. The post-consolidation milling insert may be subjected to various finishing operations such as grinding or blasting to the like to form an uncoated milling insert.

The uncoated cutting insert may be useful without a coating thereon. In the alternative, it may be beneficial to apply a coating scheme to the uncoated milling insert to form a coated milling insert. The coating scheme can be any one of a wide variety of suitable coating schemes comprising one or more separate coating layers and applied by any one or more of a wide variety of coating deposition techniques including physical vapor deposition (PVD) and chemical vapor deposition (CVD).

The cutting insert 100 may be made from one of any number of materials that are suitable for use as a cutting insert. The following materials are exemplary materials useful for a cutting insert: tool steels, cemented carbides, and Superhard material, such as Cubic Boron Nitride (CBN), Polycrystalline Cubic Boron Nitride (PCBN), Polycrystalline Diamonds (PCD), tungsten carbide (WC), cermet, ceramic, and the like. The specific materials and combinations of materials depend upon the specific application for the cutting insert 100.

In reference to tool steels, the following patent documents disclose tool steels suitable for use as a cutting insert: U.S. Pat. No. 4,276,085 for High speed Steel, U.S. Pat. No. 4,880,461 for Superhard high-speed tool steel, and U.S. Pat. No. 5,252,119 for High Speed Tool Steel Produced by Sintered Powder and Method of Producing the Same. In reference to cemented carbides, the following patent documents disclose cemented carbides suitable for use as a cutting insert: U.S. Patent Application Publication No. US2006/0171837 A1 for a Cemented Carbide Body Containing Zirconium and Niobium and Method of Making the Same, U.S. Reissue Pat. No. 34,180 for Preferentially Binder Enriched Cemented Carbide Bodies and Method of Manufacture, and U.S. Pat. No. 5,955,186 for a Coated Cutting Insert with A C Porosity Substrate Having Non-Stratified Surface Binder Enrichment. In reference to cermets, the following patent documents disclose cermets suitable for use as a cutting insert: U.S. Pat. No. 6,124,040 for Composite and Process for the Production Thereof, and U.S. Pat. No. 6,010,283 for a Cutting Insert of a Cermet Having a Co—Ni—Fe Binder. In reference to ceramics, the following patent documents disclose ceramics suitable for use as a cutting insert: U.S. Pat. No. 5,024,976 for an Alumina-zirconia-silicon carbide-magnesia Ceramic Cutting Tools, U.S. Pat. No. 4,880,755 for a SiAlON Cutting Tool Composition, U.S. Pat. No. 5,525,134 for a silicon Nitride Ceramic and Cutting Tool made thereof, U.S. Pat. No. 6,905,992 for a Ceramic Body Reinforced with Coarse Silicon Carbide Whiskers and Method for Making the Same, and U.S. Pat. No. 7,094,717 for a SiAlON Containing Ytterbium and Method of Making.

In general, the cutting insert 100 has a polygonal body 102 with a central axis, A, (i.e., parallel to the z-axis) extending therethrough. In the illustrated embodiment, the cutting insert 100 is generally diamond in shape with respective 80 degree and 100 degree opposite acute and obtuse angles. The cutting insert 100 is symmetric about all three axes (x-, y- and z-axes). However, it will be appreciated that the invention can be practiced with a non-symmetric cutting insert 100 that is any desirable shape, such as round, triangular, and the like.

The body 102 has a top face 104, an opposite bottom face 106, and a plurality of substantially planar flank faces 108, 110, 112, 114 joining the top and bottom faces 104, 106. In general, the top face 104 is substantially identical to the bottom face 106, the flank face 108 is substantially identical to the opposite flank face 112, and the flank face 110 is substantially identical to the opposite flank face 114. In addition, the plurality of flank faces 108, 110, 112, 114 are substantially perpendicular to the top and bottom faces 104, 106. However, it will be appreciated that the invention is not limited by the specific geometric shape of the cutting insert 100, and that the invention can be practiced with a cutting insert having non-perpendicular flank faces and non-identical opposite top and bottom and non-identical opposite flank faces.

A substantially planar cutting edge 108a, 110a, 112a, 114a is defined at the intersection between the top face 104 and a respective substantially planar flank face 108, 110, 112, 114. Similarly, a substantially planar cutting edge 108b, 110b, 112b, 114b is defined at the intersection between the bottom face 106 and a respective substantially planar flank face 108, 110, 112, 114. However, it will be appreciated that the invention is not limited by the specific shape of the cutting edges, and that the invention can be practiced with non-planar cutting edges.

The cutting insert 100 includes bidirectional acute cutting corners 116, 118 and cutting edge corners 116a, 118a at the intersection between the top face 104 and adjacent flank faces 108, 110, 112, 114, and bidirectional obtuse cutting corners 120, 122 and cutting edge corners 120a, 122a at the intersection between the top face 104 and adjacent flank faces 108, 110, 112, 114. Similarly, cutting insert 100 includes bidirectional acute cutting corners 116b, 118b at the intersection between the bottom face 106 and adjacent flank faces 108, 110, 112, 114, and bidirectional obtuse cutting corners 120b, 122b at the intersection between the bottom face 106 and adjacent flank faces 108, 110, 112, 114. The purpose of bidirectional acute cutting corners 116a, 116b, 118a, 118b is for primary cutting and the purpose of the bidirectional obtuse cutting corners 120a, 120b, 122a, 122b is for creating chamfers.

Figure 6:
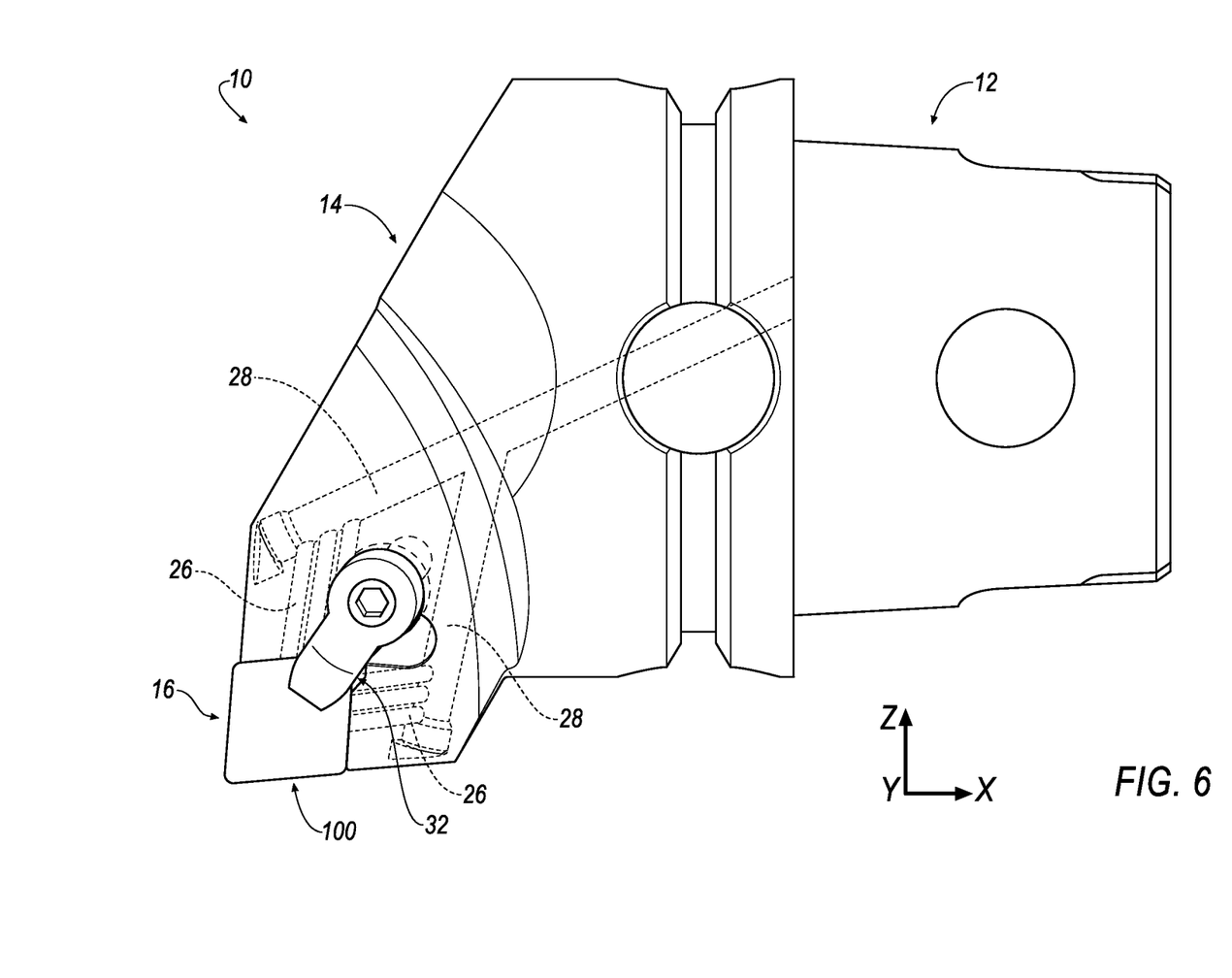
FIG. 6 is a top view of another specific embodiment of a toolholder assembly with coolant openings formed in the side support walls of the pocket and a cutting tip in a round tool according to the invention mounted in the pocket of the toolholder assembly.

For the specific embodiment shown in the figures, a central aperture 124 is provided through the cutting insert 100 for retention of the insert within the toolholder assembly 100. In another embodiment, the cutting insert 100 does not include an aperture 124 for securing the cutting insert 100 to the toolholder assembly 10. Rather, the cutting insert 100 is retained in the toolholder assembly 10 by a clamping mechanism 32, which securely retains the cutting insert 100 within the toolholder assembly 10, as shown in FIGS. 1 and 6.

One aspect of the invention is that the cutting insert 100 includes at least one coolant inlet aperture 126 formed in the top face 104, the bottom face 106, or both, that is in fluid communication with the at least one arcuate coolant opening 24 formed in the bottom support surface 18 when the cutting insert 100 is mounted in the pocket 16 of the toolholder assembly 10. Thus, the purpose of the coolant inlet aperture 126 is to serve as a coolant inlet for the cutting insert 100.

The cutting insert 100 further includes at least one internal coolant passage 128, 130 in fluid communication with the coolant inlet aperture 126. In the illustrated embodiment, the cutting insert 100 includes a pair of internal coolant passages 128, 130. One internal coolant passage 128 extends from the coolant inlet aperture 126 to a coolant outlet aperture 132 formed in the top face 104 proximate the cutting edge 108a of the cutting insert 110. The other internal coolant passage 130 extends from the coolant inlet aperture 126 to a coolant outlet aperture 134 formed in the flank face 108 proximate the cutting edge 108a of the cutting insert 100. It should be realized that the invention is not limited by the number of coolant inlet apertures 126 formed in the top face 104 and/or the bottom face 106 of the cutting insert 100, and that the invention can be practiced with any desirable number of coolant inlet apertures 126 for providing sufficient coolant to the cutting edge-chip interface. In addition, it will be appreciated that the invention is not limited by the number of internal coolant passages 128, 130, and that the invention can be practiced with any desirable number of internal coolant passages in fluid communication with any desirable number of coolant inlet apertures to provide sufficient coolant to the cutting edge-chip interface.

Another aspect of the invention is that the coolant inlet aperture 126, internal coolant passages 128, 130 and coolant outlet apertures 132, 134 are formed using a laser beam technique. One advantage of using a laser beam technique is that the apertures and passages can be precisely formed with any desirable cross-sectional shape and diameter. For example, the apertures and passages can be circular in cross-sectional shape with a relatively small diameter of about 5 microns. In another example, the apertures and passages can be non-circular in cross-sectional shape with a relatively larger diameter of between about 10 microns to about 100 microns.

One laser beam technique to produce the coolant inlet and outlet apertures 126, 132, 134 and the internal coolant passages 128, 130 is known as Laser MicroJet® that is commercially available from SYNOVA located in Ecublens, Switzerland (www.synova.ch). In general, Laser MicroJet® technology combines a laser beam with a low-pressure, pure de-ionized and filtered water jet, which cools the cutting surface and offers extreme precision debris removal. Laser MicroJet® technology involves generating a water jet using small nozzles (20-160 µm) made of sapphire or diamond, and low water pressure (100-300 bar). The water jet is not involved in the cutting operation. A high-power pulsed laser beam is focused into a nozzle in a water chamber. Lasers are pulsed with a pulse duration in the micro- or nano-second range, for example, 10 fs to 1 millisecond, and operating at a frequency of 1064 nm (IR), 532 nm (Green), or 355 nm (UV). The laser beam is guided by total inter reflection at the water/air interface, in a manner similar to conventional glass fibers, to a disk of super hard material, such as Cubic Boron Nitride (CBN), Polycrystalline Diamonds (PCD), tungsten carbide (WC), and the like. Laser MicroJet® technology has a long working distance (>100 mm).

Another similar laser beam technique using laser ablation by encasing a laser beam in a water jet is commercially available from Avonisys AG located in Zug, Switzerland (http://www.avonisys.com).

Another laser beam technique is commercially available from GFH GmbH located in Deggendorf, Germany (www.gfh-gmbh.de). This laser beam technique uses a rotating telescope of cylindrical lenses that causes rotation of the laser beam to produce a laser beam that is substantially uniform in power density. As a result, this laser beam technique can produce positive conical bores in which the entrance diameter is larger than the outlet diameter, a cylindrical bore in which the entrance and outlet diameters are equal, or negative conical bores in which the entrance diameter is smaller than the outlet diameter. The resulting bores are free of burrs and have a roundness of +/−1%.

Another laser beam technique is to use a machine equipped with a galvanometer to machine the three-dimensional cavities that make the helical flute. However, a laser beam with a variety of energy intensity distribution profiles can be adapted to achieve the best topography in the three-dimensional cavity and the cutting edge. It should be appreciated that this technique is not limited to a Gaussian laser beam profile, and that the invention can be practiced using Top-Hat or Square intensity profiles.

As described above, the bottom support surface 18 of the toolholder assembly 10 contains at least one arcuate coolant opening 24 in fluid communication with a coolant passage 26. However, it should be appreciated that the invention is not limited by the location of the coolant opening 24 in the toolholder assembly 10, and that the invention can be practiced with the coolant opening 24 having any desirable shape and location. For example, the toolholder assembly 10 can include a plurality of coolant passages 26 in fluid communication with one or more coolant sources 24 for providing coolant to the side support surfaces 20, 22 of the pocket 16, as shown in FIG. 6. In this embodiment, the cutting insert 100 includes a corresponding number of coolant inlet apertures 126 in fluid communication with each of the plurality of coolant passages 26 formed in the flank faces 108, 110, 112, 114 of the cutting insert 100. It should be realized that, in this embodiment in which the coolant inlet aperture is formed in one or more of the flank faces 108, 110, 112, 114, the coolant outlet aperture is formed only in the top face 104, the bottom face 106, or both the top and bottom faces 104, 106 of the cutting insert 100.

Figure 7:
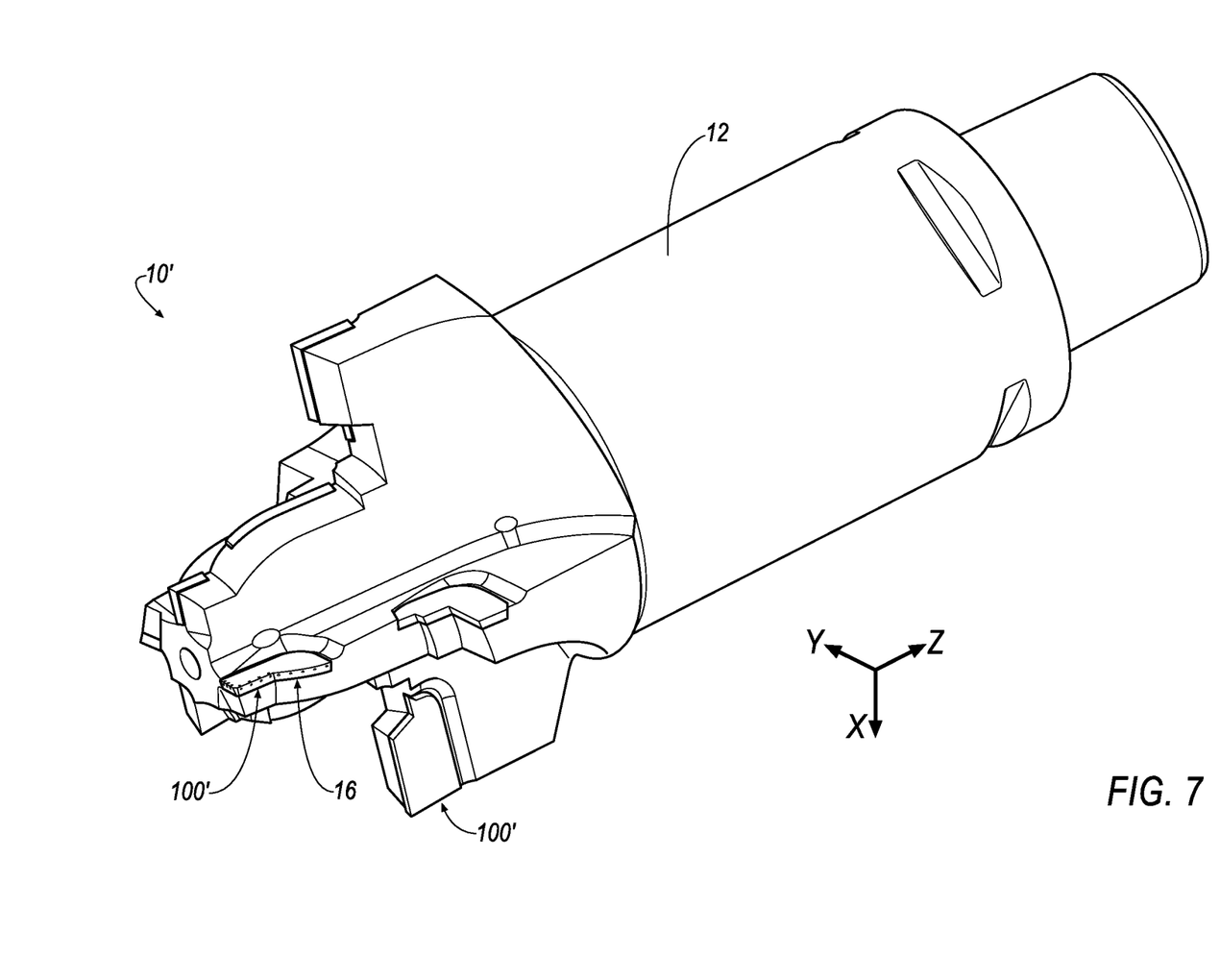
FIG. 7 is an isometric top view of a specific embodiment of a round toolholder assembly and a suitable cutting insert with internal coolant passages formed by a laser technique according to the invention mounted in the pocket of the toolholder assembly.
Figure 8:
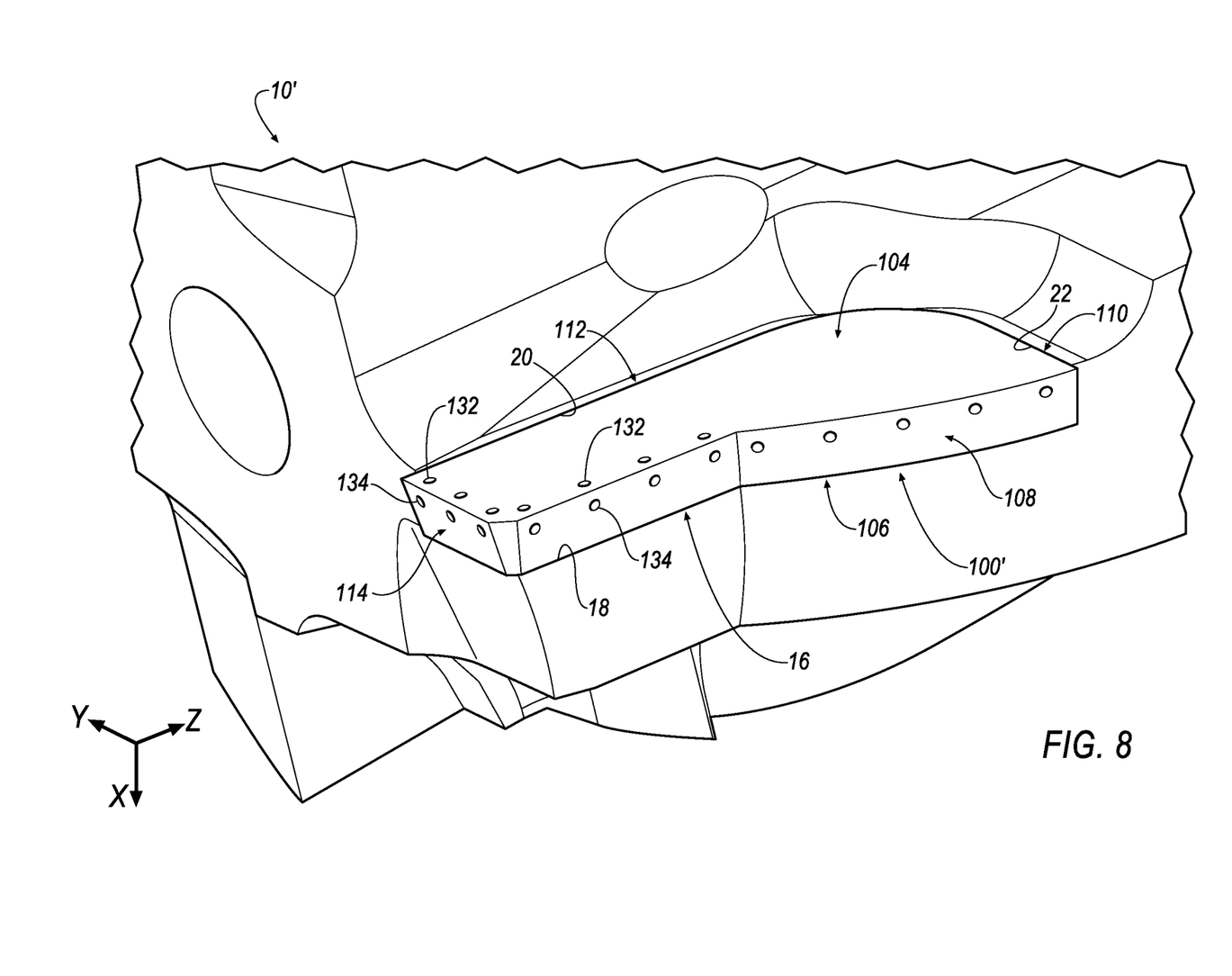
FIG. 8 is an enlarged view of the pocket of the round toolholder assembly of FIG. 7 with the cutting insert mounted in the pocket of the toolholder assembly.

It should be appreciated that the toolholder assembly 10 and the cutting insert 100 described above is an exemplary embodiment of the invention, and that the principles of the invention of providing sufficient coolant to the cutting edge-chip interface by forming coolant apertures using a laser technique can be applied to any toolholder assembly and cutting insert suitable for use therewith. For example, the principles of the invention can be applied to a round toolholder assembly 10' and a cutting insert 100', as shown in FIGS. 7 and 8.

The patents and publications referred to herein are hereby incorporated by reference.

Having described presently preferred embodiments the invention may be otherwise embodied within the scope of the appended claims.

What is claimed is:

1. A method of manufacturing a cutting insert, the cutting insert comprising a body having a top face, a bottom face opposite the top face, and at least one flank face, the method comprising:
   forming a coolant inlet aperture in one of the top face, the bottom face and the at least one flank face, at least one internal coolant passage in fluid communication with the coolant inlet aperture, and a coolant outlet aperture in fluid communication with the at least one internal coolant passage,
   wherein the coolant inlet aperture, the at least one internal coolant passage and the coolant outlet aperture are formed by using electro-magnetic radiation; and
   wherein the cutting insert has a cutting edge, and the coolant outlet aperture is formed proximate the cutting edge and is directed towards the cutting edge.

2. The method of claim 1, wherein one of the coolant inlet aperture, the at least one internal coolant passage and the coolant outlet aperture are circular in cross-sectional shape.

3. The method of claim 1, wherein one of the coolant inlet aperture, the at least one internal coolant passage and the coolant outlet aperture are non-circular in cross-sectional shape.

4. The method of claim 1, wherein the coolant inlet aperture is formed in the top face and the coolant outlet aperture is formed in one of the bottom face and the at least one of the flank face of the cutting insert.

5. The method of claim 1, wherein the coolant inlet aperture is formed in the bottom face and the coolant outlet aperture is formed in one of the top face and the at least one of the flank face of the cutting insert.

6. The method of claim 1, wherein the coolant inlet aperture is formed in the at least one flank face and the coolant outlet aperture is formed in one of the top face and the bottom face of the cutting insert.

7. The method of claim 1, wherein the coolant inlet aperture, the coolant passage and the coolant outlet aperture have a diameter of between 5 microns and 100 microns.

8. The method of claim 1, wherein the electro-magnetic radiation comprises a laser beam encased in a water jet.

9. The method of claim 1, wherein the electro-magnetic radiation has a non-Gaussian intensity profile.

10. A cutting insert manufactured using the method of claim 1.

11. The cutting insert of claim 1, wherein the cutting insert is symmetric with respect to the x-axis, y-axis and z-axis.

12. The cutting insert of claim 10, wherein the cutting insert is generally diamond in shape.

13. The cutting insert of claim 10, further comprising a plurality of flank faces, and wherein one of the flank faces is substantially identical to an opposite flank face, and another one of the flank faces is substantially identical to an opposite flank face.

14. The cutting insert of claim 10, further comprising a cutting edge defined at an intersection between the top face and the at least one flank face, and a cutting edge defined at an intersection between the bottom face and the at least one flank face.

\* \* \* \* \*